(12) United States Patent
Kaneko et al.

(10) Patent No.: US 12,730,721 B2
(45) Date of Patent: Sep. 8, 2026

(54) COMMUNICATION DEVICE AND IMAGE FORMING APPARATUS

(71) Applicants: Tomohiko Kaneko, Kanagawa (JP); Kenichi Watanabe, Kanagawa (JP); Kazuhiro Ikeda, Chiba (JP)

(72) Inventors: Tomohiko Kaneko, Kanagawa (JP); Kenichi Watanabe, Kanagawa (JP); Kazuhiro Ikeda, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 68 days.

(21) Appl. No.: 18/592,718

(22) Filed: Mar. 1, 2024

(65) Prior Publication Data

US 2024/0305733 A1 Sep. 12, 2024

(30) Foreign Application Priority Data

Mar. 10, 2023 (JP) ................................ 2023-037531

(51) Int. Cl.
*G06F 11/14* (2026.01)
*G06F 1/26* (2006.01)

(52) U.S. Cl.
CPC .......... *G06F 11/1443* (2013.01); *G06F 1/266* (2013.01)

(58) Field of Classification Search
CPC ............................ G06F 11/1443; G06F 1/266
USPC ........................................................ 714/749
See application file for complete search history.

(56) References Cited

U.S. PATENT DOCUMENTS

2004/0153696 A1* 8/2004 Govindaraman ..... G06F 1/3203 714/4.21
2006/0121866 A1* 6/2006 Yamamoto ............... H04B 1/10 455/222
2008/0057875 A1* 3/2008 Kawashima .......... H04L 1/0002 455/67.14
2011/0149796 A1* 6/2011 Qu ......................... G09G 5/363 370/254
2012/0224233 A1 9/2012 Watanabe
2014/0006655 A1* 1/2014 Chan .................. G06F 13/4282 710/16
2014/0208134 A1* 7/2014 Waters ............... G06F 13/4282 713/310

(Continued)

FOREIGN PATENT DOCUMENTS

JP 2009-141722 A 6/2009
JP 2022-069881 A 5/2022

*Primary Examiner* — James C Kerveros
(74) *Attorney, Agent, or Firm* — IPUSA, PLLC

(57) ABSTRACT

A communication device includes: a signal reception circuit to receive a differential signal and convert the differential signal into binary data; a squelch detection circuit to compare an amplitude level of the differential signal with threshold voltages to detect presence or absence of a signal and detect a non-squelch state and a squelch state; a start pattern detection circuit to enter a receivable state in response to a predetermined start pattern based on the differential signal; a register that stores a squelch setting value associated with the threshold voltages; a DC voltage selection circuit to select two DC voltages in accordance with the squelch setting value, and supply the two DC voltages to the squelch detection circuit; and a squelch setting control circuit to change the squelch setting value to increase or decrease the squelch setting value in steps and sequentially set the squelch setting value in the register.

5 Claims, 7 Drawing Sheets

(56) References Cited

U.S. PATENT DOCUMENTS

| | | | | |
|---|---|---|---|---|
| 2014/0359322 | A1* | 12/2014 | Cheong | G06F 1/266 713/310 |
| 2015/0362984 | A1* | 12/2015 | Waters | G06F 1/3287 713/324 |
| 2016/0277598 | A1 | 9/2016 | Watanabe | |
| 2017/0099392 | A1 | 4/2017 | Watanabe | |
| 2019/0052771 | A1 | 2/2019 | Sunagawa et al. | |
| 2019/0289156 | A1 | 9/2019 | Watanabe et al. | |
| 2019/0386846 | A1* | 12/2019 | Yamada | B60R 16/023 |
| 2022/0283624 | A1* | 9/2022 | Bajpai | G06F 1/3253 |

* cited by examiner

FIG. 1

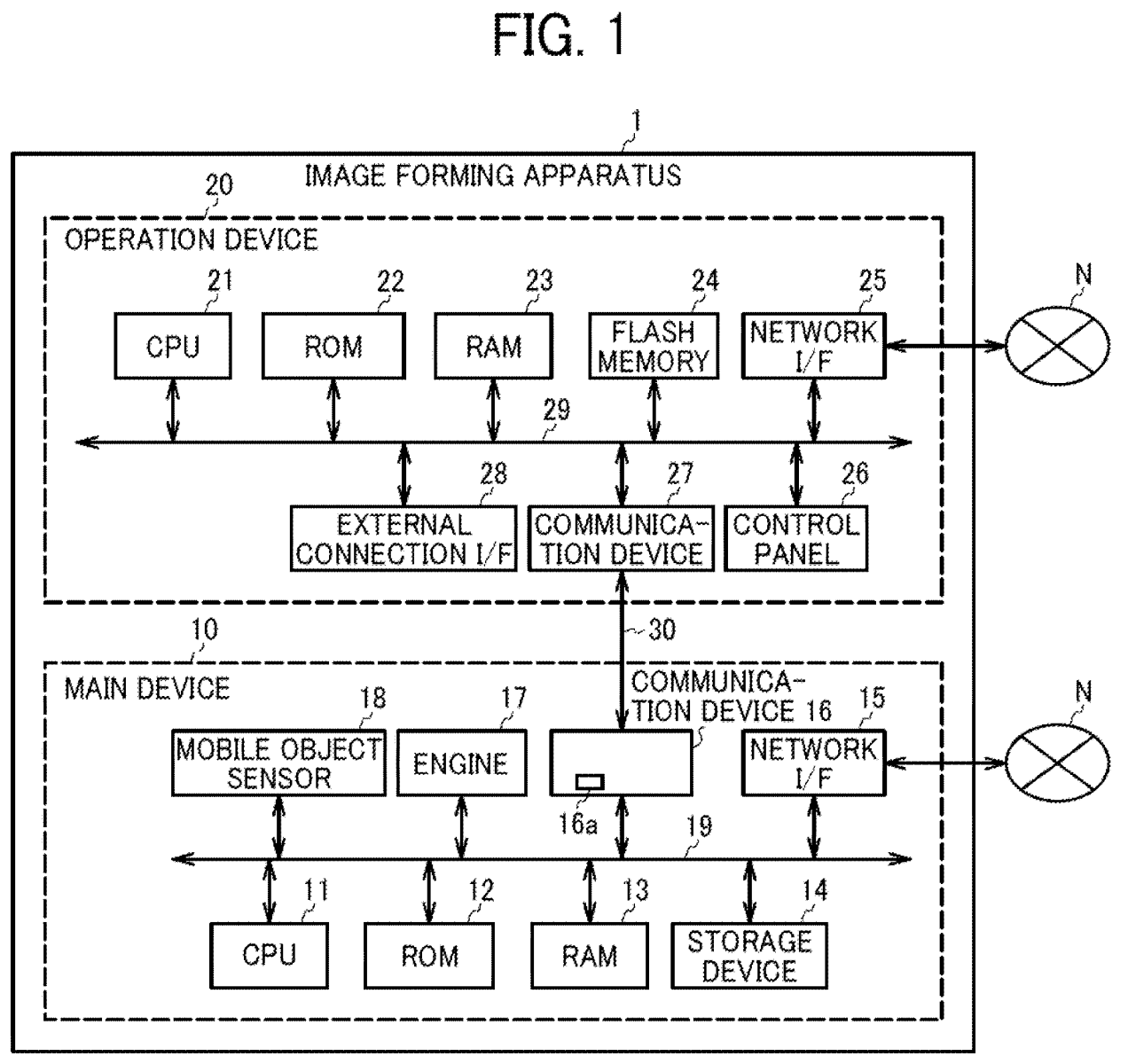

1 IMAGE FORMING APPARATUS

20 OPERATION DEVICE

21 CPU

22 ROM

23 RAM

24 FLASH MEMORY

25 NETWORK I/F

26 CONTROL PANEL

27 COMMUNICATION DEVICE

28 EXTERNAL CONNECTION I/F

29

30

N

10 MAIN DEVICE

11 CPU

12 ROM

13 RAM

14 STORAGE DEVICE

15 NETWORK I/F

16 COMMUNICATION DEVICE

16a

17 ENGINE

18 MOBILE OBJECT SENSOR

19

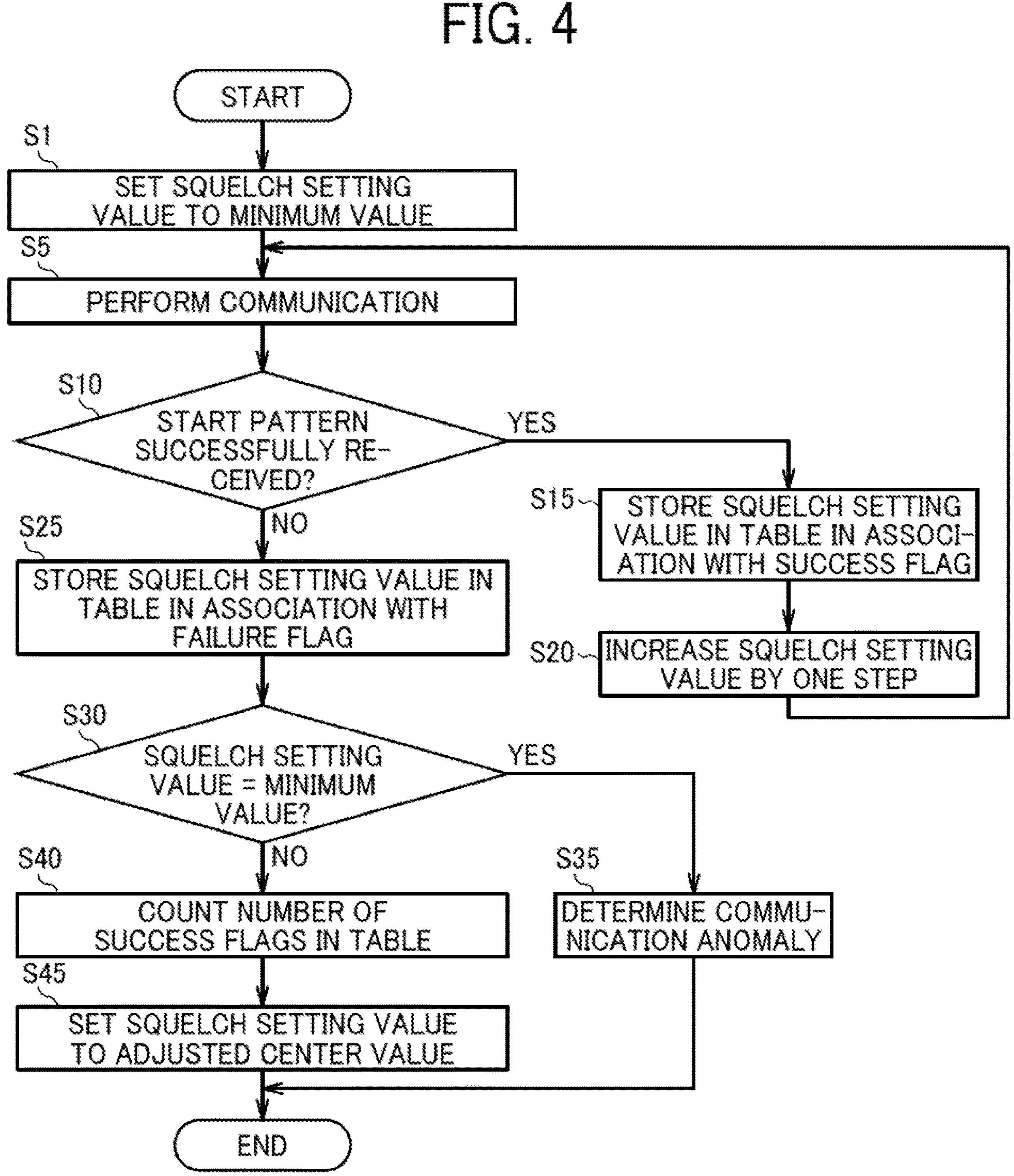
FIG. 4
START
S1
SET SQUELCH SETTING VALUE TO MINIMUM VALUE
S5
PERFORM COMMUNICATION
S10
START PATTERN SUCCESSFULLY RE-CEIVED?
YES
NO
S15
STORE SQUELCH SETTING VALUE IN TABLE IN ASSOCI-ATION WITH SUCCESS FLAG
S20
INCREASE SQUELCH SETTING VALUE BY ONE STEP
S25
STORE SQUELCH SETTING VALUE IN TABLE IN ASSOCIATION WITH FAILURE FLAG
S30
SQUELCH SETTING VALUE = MINIMUM VALUE?
YES
NO
S35
DETERMINE COMMU-NICATION ANOMALY
S40
COUNT NUMBER OF SUCCESS FLAGS IN TABLE
S45
SET SQUELCH SETTING VALUE TO ADJUSTED CENTER VALUE
END

FIG. 5

| SQUELCH SETTING VALUE | COMMUNICATION TEST STEP | | | | | | |
|---|---|---|---|---|---|---|---|
| | 1 | 2 | 3 | 4 | 5 | 6 | 7 |
| 11(Min) | ○ | – | – | – | – | – | – |
| 22 ↓ | – | ○ | – | – | – | – | – |
| 33 ↓ | – | – | ○ | – | – | – | – |
| 44 ↓ | – | – | – | × | – | – | – |
| 55 ↓ | – | – | – | – | – | – | – |
| 66(Max) | – | – | – | – | – | – | – |

| | COMMUNICATION TEST STEP | | | | | | |
|---|---|---|---|---|---|---|---|
| SQUELCH SETTING VALUE | 1 | 2 | 3 | 4 | 5 | 6 | 7 |
| 11(Min) | ○ | – | – | – | – | – | – |
| 22 ↓ | – | ○ | – | – | – | – | – |
| 33 ↓ | – | – | ○ | – | – | – | – |
| 44 ↓ | – | – | – | ○ | – | – | – |
| 55 ↓ | – | – | – | – | × | – | – |
| 66(Max) | – | – | – | – | – | – | – |

COMMUNICATION DEVICE AND IMAGE FORMING APPARATUS

CROSS-REFERENCE TO RELATED APPLICATIONS

This patent application is based on and claims priority pursuant to 35 U.S.C. § 119(a) to Japanese Patent Application No. 2023-037531, filed on Mar. 10, 2023, in the Japan Patent Office, the entire disclosure of which is hereby incorporated by reference herein.

BACKGROUND

Technical Field

The present disclosure relates to a communication device and an image forming apparatus.

Related Art

When a change in ambient temperature on the transmission side causes a communication error of a differential signal (e.g., disconnection of communication of a Universal Serial Bus (USB) signal), a communication device of the related art automatically changes an emphasis level (signal level), stores an emphasis level at which communication is successful, and performs settings again to reduce the number of times of recovery processing and thus minimize the time and effort for recovery.

For example, there is a technique of allowing the transmission side to automatically adjust or set the emphasis level and thus reducing the number of times of recovery processing that is performed in response to the occurrence of a communication error. Such a technique can minimize the time and effort for recovery even if a change in ambient temperature of a communication terminal causes a communication error while the communication terminal is communicating with another communication terminal.

SUMMARY

According to an embodiment of the present disclosure, a communication device includes a signal reception circuit, a squelch detection circuit, a start pattern detection circuit, a register, a DC voltage selection circuit, and a squelch setting control circuit. The signal reception circuit receives a differential signal transmitted from another communication device via a communication cable, and converts the differential signal into binary data. The squelch detection circuit compares an amplitude level of the differential signal with threshold voltages to detect presence or absence of a signal and detect a non-squelch state and a squelch state. The start pattern detection circuit enters a receivable state in response to a predetermined start pattern being detectable from the binary data based on the differential signal in a case where the squelch detection circuit detects the non-squelch state. The register stores a squelch setting value associated with the threshold voltages. The DC voltage selection circuit selects two DC voltages from among multiple DC voltages in accordance with the squelch setting value output from the register, and supplies the two DC voltages as the threshold voltages to the squelch detection circuit. In response to the start pattern detection circuit detecting the receivable state, the squelch setting control circuit changes the squelch setting value to increase or decrease the squelch setting value in steps and sequentially sets the squelch setting value in the register.

According to another embodiment of the present disclosure, an image forming apparatus includes the above-described communication device and an engine. The engine performs an image forming process.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 1 is a diagram illustrating a hardware configuration of an image forming apparatus according to one embodiment of the present disclosure;

FIG. 4 is a flowchart illustrating a control procedure of a reception-side communication device which is the communication device according to the first embodiment of the present disclosure;

FIG. 5 is a diagram illustrating an example of content of a table storing squelch setting values in the communication device according to the first embodiment of the present disclosure;

FIG. 6 is a diagram illustrating an example of a waveform representing an example of a basic adjustment performed by the communication device according to the first embodiment of the present disclosure;

FIG. 7 is a diagram illustrating an example of content of a table storing squelch setting values in the communication device according to the first embodiment of the present disclosure.

Figure 2:
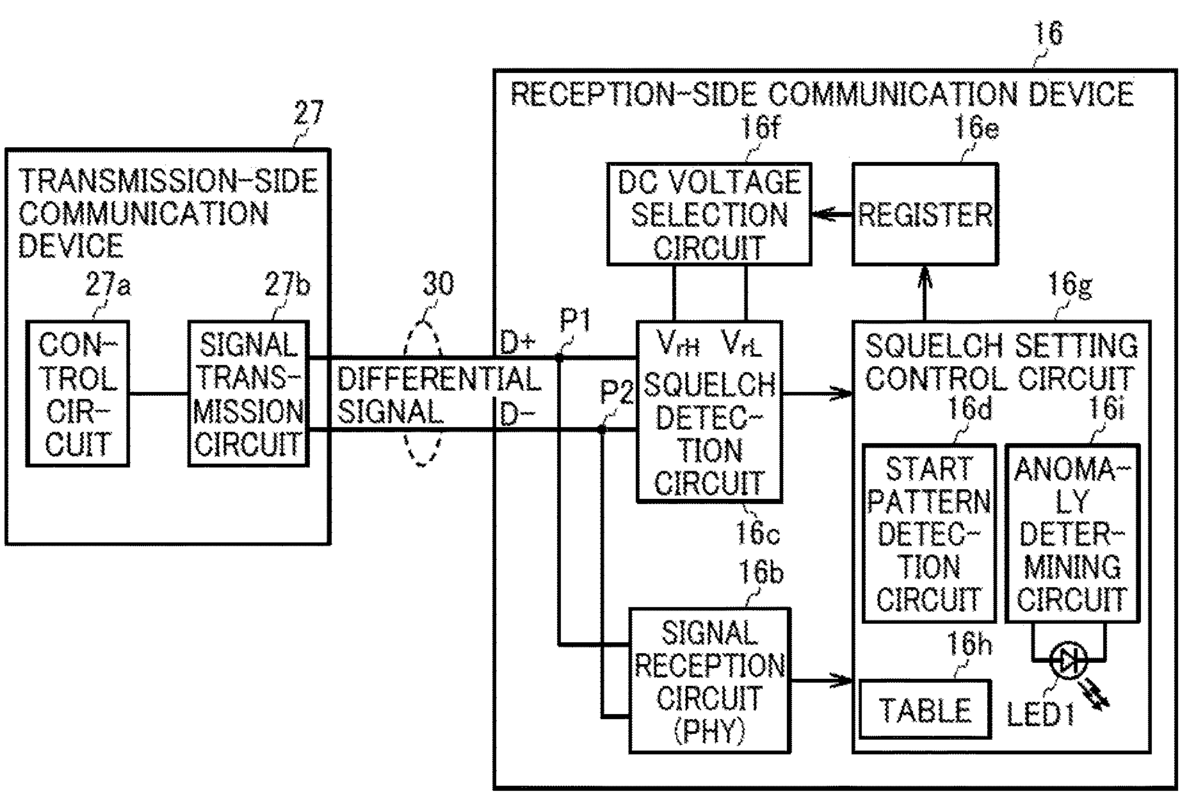
FIG. 2 is a block diagram illustrating a configuration in which communication devices according to a first embodiment of the present disclosure communicate with each other.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Reception-side communication devices have characteristics that vary from communication device to communication device and thus usually have different threshold voltages related to squelch (reception sensitivity). For this reason, for example, if a specific threshold voltage related to squelch is set for all communication devices at the time of manufacturing of the communication devices, the variation in characteristics may lead to erroneous detection of a differential signal depending on a use environment in which each of the communication devices is installed.

According to an embodiment of the present disclosure, to adjust threshold voltages related to squelch that enables successful reception at the time of connection of a communication cable and thus suppress erroneous detection due to a variation in characteristics, a reception-side communication device has a configuration below.

Specifically, according to an embodiment of the present disclosure, a communication device includes a signal reception circuit, a squelch detection circuit, a start pattern detection circuit, a register, a DC voltage selection circuit, and a squelch setting control circuit. The signal reception circuit receives a differential signal transmitted from another communication device via a communication cable, and converts the differential signal into binary data. The squelch detection circuit compares an amplitude level of the differential signal with threshold voltages to detect presence or absence of a signal and detect a non-squelch state and a squelch state. The start pattern detection circuit enters a receivable state in response to a predetermined start pattern being detectable from the binary data based on the differential signal in a case where the squelch detection circuit detects the non-squelch state. The register stores a squelch setting value associated with the threshold voltages. The DC voltage selection circuit selects two DC voltages from among multiple DC voltages in accordance with the squelch setting value output from the register, and supplies the two DC voltages as the threshold voltages to the squelch detection circuit. In response to the start pattern detection circuit detecting the receivable state, the squelch setting control circuit changes the squelch setting value to increase or decrease the squelch setting value in steps and sequentially sets the squelch setting value in the register.

The reception-side communication device having the above configuration adjusts threshold voltages related to squelch that enables successful reception at the time of connection of a communication cable and thus successfully suppresses erroneous detection due to a variation in characteristics.

Features of the present disclosure described above will be described in detail below with reference to the accompanying drawings. Note that elements, types, combinations, shapes, relative arrangements of elements, and the like described in embodiments of the present disclosure are not intended to limit the scope of the present disclosure thereto but are merely examples of description unless otherwise specified.

Hardware Configuration

FIG. 1 is a diagram illustrating a hardware configuration of an image forming apparatus according to one embodiment of the present disclosure.

Hardware Configuration of Main Device

A hardware configuration of a main device 10 of an image forming apparatus 1 will be described below.

As illustrated in FIG. 1, the main device 10 includes a central processing unit (CPU) 11, a read-only memory (ROM) 12, a random access memory (RAM) 13, a storage device 14, a network interface (I/F) 15, a communication device 16, an engine 17, a mobile object sensor 18, and a system bus 19.

The CPU 11 uses the RAM 13 as a work area and executes a program stored in the ROM 12, the storage device 14, or the like to control operations of the entire main device 10. For example, the CPU 11 uses the engine 17 to implement various functions such as a copy function, a scanner function, a facsimile function, and a printer function.

The ROM 12 is, for example, a nonvolatile memory that stores a basic input/output system (BIOS) executed at the time of booting the main device 10, various settings, and so on. The RAM 13 is a volatile memory used as a work area of the CPU 11. The storage device 14 is, for example, a nonvolatile storage device that stores an operating system (OS), an application program, various kinds of data, and so on. The storage device 14 is, for example, a hard disk drive (HDD) or a solid state drive (SSD).

The network I/F 15 is a network interface that connects the main device 10 to a network N to enable communication with an external apparatus connected to the network N. The network I/F 15 is, for example, a network interface for a wireless local area network (LAN), a wired LAN, or the like.

The communication device 16 is a communication interface that enables communication between the main device 10 and an operation device 20 via a USB cable 30. The communication device 16 includes a CPU 16*a*. The communication device 16 performs USB communication via USB ports P1 to P3 and is controlled by the CPU 16*a*.

The engine 17 is hardware that performs general-purpose information processing and non-communication processing for implementing image forming functions such as the copy function, the scanner function, the facsimile function, and the printer function. The engine 17 includes, for example, a scanner (image reading device) that scans and reads an image of a document, a plotter (image forming device) that prints an image on a sheet material such as paper, and a facsimile device that performs facsimile communication. The engine 17 may further include a particular optional device such as a finisher that sorts printed sheet materials or an automatic document feeder (ADF) that automatically feeds a document.

The mobile object sensor 18 is a sensor that detects a mobile object such as a human body located within a detection range around the image forming apparatus 1. For example, a pyroelectric sensor or the like is used. Note that in the present embodiment, the mobile object sensor 18 may be omitted from the image forming apparatus 1.

The system bus 19 is connected to the above-described components and transfers address signals, data signals, various control signals, and so on.

Hardware Configuration of Operation Device

A hardware configuration of the operation device 20 will be described below. As illustrated in FIG. 1, the operation device 20 includes a CPU 21, a ROM 22, a RAM 23, a flash memory 24, a network I/F 25, a control panel 26, a communication device 27, an external connection I/F 28, and a system bus 29. The operation device 20 may further include a radio frequency (RF) tag reader and a camera.

The CPU 21 uses the RAM 23 as a work area and executes a program stored in the ROM 22, the flash memory 24, or the like to control operations of the entire operation device 20.

The ROM 22 is, for example, a nonvolatile memory that stores a BIOS executed at the time of booting the operation device 20, various settings, and so on. The RAM 23 is a volatile memory used as a work area of the CPU 21. The flash memory 24 is, for example, a nonvolatile storage device that stores an OS, an application program, various kinds of data, and so on.

The network I/F 25 is a network interface that connects the operation device 20 to a network N to enable communication with an external apparatus connected to the network N. The network I/F 25 is, for example, a network interface for a wireless LAN, a wired LAN, or the like.

The control panel 26 receives various inputs according to operations by a user, and displays various kinds of information. The control panel 26 is, for example, a liquid crystal display (LCD) having a touch panel function. However, the control panel 26 is not limited to such an LCD.

The control panel 26 may be, for example, an organic electro luminescence (EL) display having a touch panel function. In alternative to or in addition to the LCD or the organic EL display, the control panel 26 may include operation members such as hardware keys and/or an indicator such as an indicator lamp.

The communication device 27 is an interface that enables communication between the operation device 20 and the main device 10 via the USB cable 30. The communication device 27 is, for example, a USB communication device.

The external connection I/F 28 is an interface that connects an external device to the operation device 20. The external connection I/F 28 is, for example, an interface such as a USB.

The system bus 29 is connected to the above-described components and transfers address signals, data signals, various control signals, and so on.

First Embodiment

FIG. 2 is a block diagram illustrating a configuration in which communication devices according to a first embodiment of the present disclosure communicate with each other.

In FIG. 2, two communication devices are connected to each other via the USB cable 30. For ease of explanation, one of the two communication devices is the communication device 27 that has a role of a transmission-side host device, and the other of the two communication devices is the communication device 16 that has a role of a reception-side device.

Transmission-Side Communication Device

The communication device 27 on the transmission side includes a control circuit 27*a* and a signal transmission circuit 27*b*.

For example, the control circuit 27*a* converts a predetermined start pattern into binary data, and outputs the binary data to the signal transmission circuit 27*b*.

The signal transmission circuit 27*b* converts the binary data into a differential signal, and transmits the differential signal to the communication device 16 via the USB cable (communication cable) 30 connected to two terminals of the communication device 27.

Reception-Side Communication Device

The reception-side communication device 16 includes a signal reception circuit 16*b*, a squelch detection circuit 16*c*, a register 16*e*, a direct-current (DC) voltage selection circuit 16*f*, and a squelch setting control circuit 16*g* including a start pattern detection circuit 16*d* and an anomaly determining circuit 16*i*.

The signal reception circuit 16*b* receives the differential signal transmitted from the communication device 27 via the USB cable (communication cable) 30 connected to two terminals of the communication device 16, and converts the differential signal into binary data.

The squelch detection circuit 16*c* are connected to the two terminals. The squelch detection circuit 16*c* compares an amplitude level of the differential signal with threshold voltages to detect the presence or absence of a signal and thus detect a non-squelch state (in which the signal is present) or a squelch state (in which the signal is absent).

To simplify the description, the squelch detection circuit 16*c* is provided separately from the signal reception circuit 16*b* in the present embodiment. However, the squelch detection circuit 16*c* may be incorporated in the signal reception circuit 16*b*.

The start pattern detection circuit 16*d* enters a receivable state in response to the predetermined start pattern being detectable from the binary data based on the differential signal in the case where the squelch detection circuit 16*c* detects the non-squelch state.

The register 16*e* stores a squelch setting value (data) associated with threshold voltages.

In accordance with the squelch setting value (data) output from the register 16*e*, the DC voltage selection circuit 16*f* selects two DC voltages from multiple DC voltages, and supplies the two DC voltages as threshold voltages to the squelch detection circuit 16*c*. Note that the squelch setting value is a value (data) associated with multiple threshold voltages (analog voltages) to be supplied to the squelch detection circuit 16*c*. The multiple threshold voltages are multiple stepped voltages lower than a high-level region voltage $V_{SH}$ of the differential signal. The multiple threshold voltages are also multiple stepped voltages higher than a low-level region voltage $V_{SL}$ of the differential signal.

In response to the start pattern detection circuit 16*d* detecting the receivable state, the squelch setting control circuit 16*g* performs control to change the squelch setting value (data) to increase the squelch setting value in steps and sequentially set the squelch setting value (data) in the register 16*e*.

The anomaly determining circuit 16*i* has a function of determining a communication error in the case where the squelch setting value is not within a predetermined range. That is, the anomaly determining circuit 16*i* determines a communication error in the case where the start pattern detection circuit 16*d* is not in the receivable state.

In the present embodiment, physical schemes related to network connection and data transmission between the signal transmission circuit 27*b* and the signal reception circuit 16*b*, such as a data representation scheme on a transmission channel and a shape of an interface, are defined for a channel such as a physical layer (PHY).

The squelch setting control circuit 16*g* includes a table 16*h* that stores squelch setting values (data).

The squelch setting control circuit 16*g* performs control to change the squelch setting value to increase the squelch setting value in steps, sequentially set the squelch setting value in the register 16*e*, and sequentially store the squelch setting value in the table 16*h*.

In response to the start pattern detection circuit 16*d* detecting the receivable state, the squelch setting control circuit 16*g* performs control to store a success flag in the table 16*h* in association with the squelch setting value (data) used at the time of the detecting of the receivable state.

The squelch setting control circuit 16*g* performs control to read the success flags associated with different squelch setting values from the table 16*h*, count the number of success flags, and obtain the number of success steps.

When the number of success steps is an odd number, the squelch setting control circuit 16*g* performs control to set the squelch setting value that enables successful reception to a center value of squelch setting values of the success steps.

When the number of success steps is an even number, the squelch setting control circuit 16*g* performs control to set the squelch setting value that enables successful reception to a value closer to a maximum squelch setting value by one step among middle squelch setting values of the success steps.

The squelch setting control circuit 16*g* performs control to sequentially set, in the register 16*e*, the squelch setting value that is changed to increase in steps. In response to the start pattern detection circuit 16*d* detecting a transition of the receivable state to a not-receivable state at a certain step, the squelch setting control circuit 16*g* performs control to switch the squelch setting value set in the register 16*e* to a value that is smaller than the set squelch setting value by one step or two steps.

DC Voltage Selection Circuit

Figure 3:
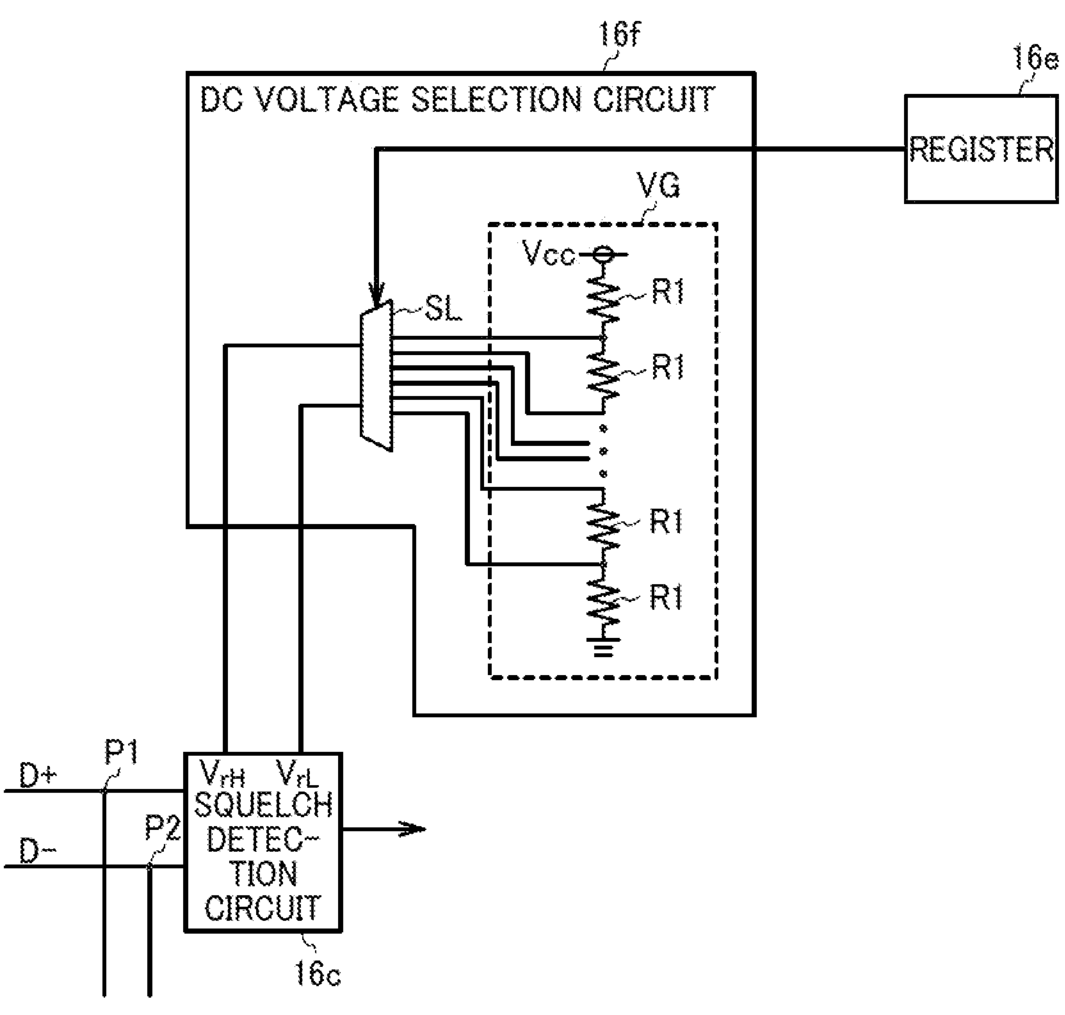
FIG. 3 is a block diagram illustrating in detailed a connection configuration of a DC voltage selection circuit and a squelch detection circuit which are components of the communication device according to the first embodiment of the present disclosure.

FIG. 3 is a block diagram illustrating in detail a connection configuration of the DC voltage selection circuit and the squelch detection circuit which are components of the communication device according to the first embodiment of the present disclosure.

The register 16*e* stores the squelch setting value set by the squelch setting control circuit 16*g*. The register 16*e* also outputs the stored squelch setting value to a selector switch SL of the DC voltage selection circuit 16*f*.

In accordance with the squelch setting value output from the register 16*e*, the DC voltage selection circuit 16*f* selects two DC voltages from among multiple DC voltages and outputs the two DC voltages to two terminals of the squelch detection circuit 16*c*.

The DC voltage selection circuit 16*f* includes the selector switch SL and a voltage generation circuit VG.

As illustrated in FIG. 3, in the USB communication scheme, which implements serial communication, the differential signal is transmitted using two signal lines $D^+$ and $D^-$ included in the USB cable (communication cable) 30.

As illustrated in FIG. 3, a $D^+$ port and $D^-$ port are connected to the signal reception circuit 16*b* and the squelch detection circuit 16*c* from the respective signal channels through respective terminals P1 and P2.

In the DC voltage selection circuit 16*f*, the voltage generation circuit VG divides the voltage with multiple series-connected resistors R1 disposed between a power supply VCC and ground GND to generate various voltages. The selector switch SL selects voltages to be output to the squelch detection circuit 16*c* as a high-level threshold voltage $V_{rH}$ and a low-level threshold voltage $V_{rL}$ from among the voltages generated by the voltage generation circuit VG. The setting of the selector switch SL is determined by the squelch setting value which is data ($D_H D_L$) stored in the register 16*e*.

The DC voltage selection circuit 16*f* selects two DC voltages from among the multiple DC voltages in accordance with the squelch setting value output from the register 16*e*, and supplies the two DC voltages as the high-level threshold voltage $V_{rH}$ and the low-level threshold voltage $V_{rL}$ to the squelch detection circuit 16*c*.

That is, the selector switch SL switches the two threshold voltages to be compared with the amplitude level of the differential signal input from the $D^+$ port and the $D^-$ port in the squelch detection circuit 16*c*, so as to adjust the two threshold voltages, i.e., the high-level threshold voltage $V_{rH}$ and the low-level threshold voltage $V_{rL}$, for determining the amplitude level of the differential signal input to the squelch detection circuit 16*c*.

Control Procedure

FIG. 4 is a flowchart illustrating a control procedure of the reception-side communication device 16 which is the communication device according to the first embodiment of the present disclosure.

The flowchart according to the first embodiment illustrated in FIG. 4 has characteristics that in response to the start pattern detection circuit 16*d* detecting the receivable state, the squelch setting control circuit 16*g* performs control to change the squelch setting value (data) to increase the squelch setting value in steps and sequentially set the squelch setting value in the register 16*e*. The characteristics of the flowchart will be described in detail below.

In step S1, at the initial booting, the squelch setting control circuit 16*g* sets a minimum (Min) squelch setting value ($D_H D_L$) (e.g., "11") in the register 16*e*.

For example, once the value (11) is set as the data ($D_H D_L$) in the register 16*e*, the selector switch SL operates in accordance with the value (11) which is the data ($D_H D_L$) and selects voltages to be output as the high-level threshold voltage $V_{rH}$ and the low-level threshold voltage $V_{rL}$ to the squelch detection circuit 16*c* from among the voltages generated by the voltage generation circuit VG.

In step S5, the communication device 27 and the communication device 16 perform communication of the differential signal via the USB cable (communication cable) 30. In this case, the communication device 27 transmits, to the communication device 16, packet signals in which a packet signal of the squelch state having no signal and a packet signal of the non-squelch state having a predetermined start pattern are alternately repeated in a time-division manner.

In step S10, the squelch setting control circuit 16*g* of the communication device 16 determines whether the start pattern detection circuit 16*d* has successfully received, via the signal reception circuit 16*b*, the packet signal representing the predetermined start pattern transmitted from the communication device 27.

Specifically, if the squelch setting control circuit 16*g* determines that the start pattern detection circuit 16*d* has successfully received the packet signal representing the predetermined start pattern transmitted from the communication device 27, the process proceeds to step S15. On the other hand, if the squelch setting control circuit 16*g* determines that the communication device 16 fails to receive the predetermined start pattern transmitted from the host device (i.e., the communication device 27), the process proceeds to step S25.

In the case of YES in step S10, in response to the start pattern detection circuit 16*d* detecting the receivable state, the squelch setting control circuit 16*g* performs control to store a success flag in the table 16*h* in association with the squelch setting value used at the time of the detecting of the receivable state in step S15.

In step S20, the squelch setting control circuit 16*g* increases the squelch setting value in the communication device 16 by one step from the current value and sets the resulting setting value in the register 16*e*. The process then returns to step S5. For example, when the current squelch setting value is (11), the squelch setting value is changed, through the processing of step S20, to (22) which is increased by one step.

In step S5, the communication device 27 and the communication device 16 perform communication of the differential signal via the USB cable (communication cable) 30.

On the other hand, in the case of No in step S10, the squelch setting control circuit 16*g* stores a failure flag in the table 16*h* in association with the squelch setting value in step S25.

In step S30, the squelch setting control circuit 16*g* determines whether the squelch setting value in the communication device 16 is the minimum value.

If the squelch setting control circuit 16*g* determines that the squelch setting value in the communication device 16 is the minimum value, the process proceeds to step S35. On the other hand, the squelch setting control circuit 16*g* determines that the squelch setting value in the communication device 16 is not the minimum value, the process proceeds to step S40.

In the case of Yes in step S30, since the squelch setting control circuit 16*g* can no longer set the squelch setting value to a value larger than the minimum value, the anomaly determining circuit 16*i* determines a communication anomaly and issues an anomaly notification in step S35. As the anomaly notification, the anomaly determining circuit 16*i* may cause a light-emitting diode (LED) "LED1" (see FIG. 2) to emit light to report the anomaly to a user.

In the case of No in step S30, in step S40, the squelch setting control circuit 16*g* performs control to sequentially read the success flags (e.g., "○" which means a success) associated with different squelch setting values from the table 16*h*, counts the number of success flags, and obtain the number of success steps.

In step S45, the squelch setting control circuit 16*g* adjusts the squelch setting value in the communication device 16 and sets the squelch setting value to the center value at which connection is successful.

Specifically, if the number of success steps is an odd number, the squelch setting control circuit 16*g* performs control to set the squelch setting value that enables successful reception to the center value of squelch setting values of the success steps.

On the other hand, if the number of success steps is an even number, the squelch setting control circuit 16*g* performs control to set the squelch setting value that enables successful reception to a value closer to a maximum squelch setting value by one step among middle squelch setting values of the success steps.

First Example of Content of Table

Figures 5, 6:
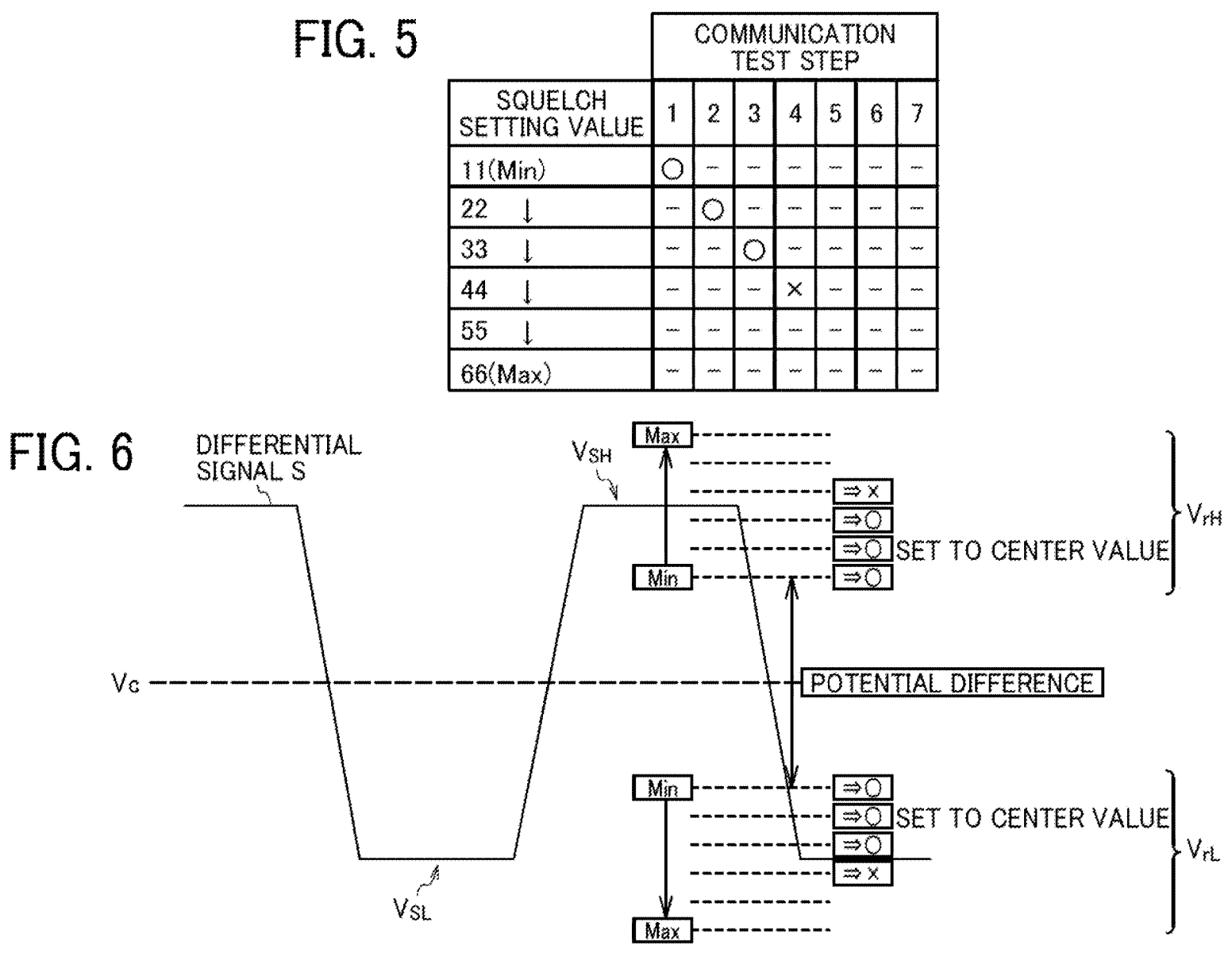

FIG. 5 is a diagram illustrating a first example of content of a table storing squelch setting values in the communication device according to the first embodiment of the present disclosure.

The table 16*h* illustrated in FIG. 5 presents a squelch setting value in the vertical direction and a communication test step in the horizontal direction. The squelch setting value includes data ($D_HD_L$), where $D_H$ denotes a numerical value on the left side and $D_L$ denotes a numerical value on the right side. For example, (11), (22), (33), (44), (55), and (66) are assigned. The communication test step ranges from 1 to 7, for example.

As illustrated in FIG. 5, when the squelch setting value ($D_HD_L$) is the minimum value (11), the communication test step is 1. In this case, the high-level threshold voltage $V_{rH}$ and the low-level threshold voltage $V_{rL}$ selected by the selector switch SL are supplied to the squelch detection circuit 16*c*. If the start pattern detection circuit 16*d* successfully receives the packet signal representing the predetermined start pattern transmitted from the communication device 27, the success flag is stored in the table 16*h* in association with the squelch setting value ($D_HD_L$).

That is, as a result of the first communication test performed using the minimum value (11) of the squelch setting value, "○" (success) is stored as the success flag in the table 16*h*.

Subsequently, as a result of the second communication test performed using a value (22) which is increased by one step from the squelch setting value in the first communication test, "○" (success) is stored in the table 16*h*.

Subsequently, as a result of the third communication test performed using a value (33) which is increased by one step from the squelch setting value in the second communication test, "○" (success) is stored in the table 16*h*.

Subsequently, as a result of the fourth communication test performed using a value (44) which is increased by one step from the squelch setting value in the third communication test, "x" (failure) is stored in the table 16*h*.

The squelch setting control circuit 16*g* performs control to sequentially read the success flags associated with the different squelch setting values from the table 16*h*, count the number of success flags, and obtain the number of success steps.

Since the number of test results with "○" (success) is three, that is, an odd number, it is appropriate to adopt the squelch setting value (22) in the second communication test as the center value.

Waveform Representing Example Basic Adjustment

FIG. 6 is a diagram illustrating an example of a waveform representing an example of a basic adjustment performed by the communication device according to the first embodiment of the present disclosure.

Two signal lines $D^+$ and $D^-$ included in the USB cable (communication cable) 30 are used to transmit the differential signal. In this case, waveforms in the two signal lines form an eye opening.

The squelch setting control circuit 16*g* according to the first embodiment performs control to sequentially switch the threshold voltages from the inside toward the outside of the eye opening. That is, the squelch setting control circuit 16*g* performs control to change the squelch setting value (data) to increase the squelch setting value in steps and sequentially set the squelch setting value in the register 16*e*.

The squelch detection circuit 16*c* detects the presence or absence of a differential signal S in accordance with whether an amplitude level of the differential signal S exceeds the threshold voltages to detect the non-squelch state (in which the signal is present) and the squelch state (in which the signal is absent).

First Communication Test

Specifically, the squelch detection circuit 16*c* is supplied with the high-level threshold voltage $V_{rH}$ and the low-level threshold voltage $V_{rL}$ associated with the first squelch setting value (11). When a potential difference $\Delta V_L$ between a low-level region voltage $V_{SL}$ of the differential signal S and the low-level threshold voltage $V_{rL}$ is positive and satisfies $V_{SL}-V_{rL}=\Delta V_{rL}>0$ (1) and a potential difference $\Delta V_H$ between a high-level region voltage $V_{SH}$ of the differential signal S and the high-level threshold voltage $V_{rH}$ is positive and satisfies $V_{SH}-V_{rH}=\Delta V_H>0$ (2), "○" (success) is stored as the success flag in the table 16*h* as a result of the first communication test performed using the minimum value (11) of the squelch setting value.

Second Communication Test

The first squelch setting value (11) is increased by one step. The squelch detection circuit 16*c* is supplied with the high-level threshold voltage $V_{rH}$ and the low-level threshold voltage $V_{rL}$ associated with the second squelch setting value (22). When the potential difference $\Delta V_L$ between the low-level region voltage $V_{SL}$ of the differential signal S and the low-level threshold voltage $V_{rL}$ is positive and satisfies $V_{SL}-V_{rL}=\Delta V_L>0$ (3) and the potential difference $\Delta V_H$ between the high-level region voltage $V_{SH}$ of the differential signal S and the high-level threshold voltage $V_{rH}$ is positive and satisfies $V_{SH}-V_{rH}=\Delta V_H>0$ (4), "○" (success) is stored as the success flag in the table 16*h* as a result of the second communication test performed using the squelch setting value (22).

Third Communication Test

The second squelch setting value (22) is increased by one step. The squelch detection circuit 16*c* is supplied with the high-level threshold voltage $V_{rH}$ and the low-level threshold voltage $V_{rL}$ associated with the third squelch setting value (33). When the potential difference $\Delta V_L$ between the low-level region voltage $V_{SL}$ of the differential signal S and the low-level threshold voltage $V_{rL}$ is positive and satisfies $V_{SL}-V_{rL}=\Delta V_{rL}>0$ (5) and the potential difference $\Delta V_H$ between the high-level region voltage $V_{SH}$ of the differential signal S and the high-level threshold voltage $V_{rH}$ is positive and satisfies $V_{SH}-V_{rH}=\Delta V_H>0$ (6), "○" (success) is stored as the success flag in the table 16*h* as a result of the third communication test performed using the squelch setting value (33).

Fourth Communication Test

The third squelch setting value (33) is increased by one step. The squelch detection circuit 16*c* is supplied with the high-level threshold voltage $V_{rH}$ and the low-level threshold voltage $V_{rL}$ associated with the fourth squelch setting value (44). When the potential difference $\Delta V_L$ between the low-level region voltage $V_{SL}$ of the differential signal S and the low-level threshold voltage $V_{rL}$ is positive and does not satisfy $V_{SL}-V_{rL}=\Delta V_{rL}>0$ (7) and the potential difference $\Delta V_H$ between the high-level region voltage $V_{SH}$ of the differential signal S and the high-level threshold voltage $V_{rH}$ is positive and does not satisfy $V_{SH}-V_{rH}=\Delta V_H>0$ (8), "x" (failure) is stored as the failure flag in the table 16*h* as a result of the fourth communication test performed using the squelch setting value (44).

The squelch setting control circuit 16*g* performs control to sequentially read the success flags associated with the different squelch setting values from the table 16*h*, count the number of success flags, and obtain the number of success steps.

Since the number of test results with "○" (success) is three, that is, an odd number, it is appropriate to adopt the second squelch setting value (22) as the center value.

Second Example of Content of Table

FIG. 7 is a diagram illustrating a second example of content of a table storing squelch setting values in the communication device according to the first embodiment of the present disclosure.

As illustrated in FIG. 7, when the squelch setting value ($D_HD_L$) is the minimum value (11), the communication test step is 1. In this case, the high-level threshold voltage $V_{rH}$ and the low-level threshold voltage $V_{rL}$ selected by the selector switch SL are supplied to the squelch detection circuit 16*c*. If the start pattern detection circuit 16*d* successfully receives the packet signal representing the predetermined start pattern transmitted from the communication device 27, the success flag is stored in the table 16*h* in association with the squelch setting value ($D_HD_L$).

That is, as a result of the first communication test performed using the minimum value (11) of the squelch setting value, "○" (success) is stored in the table 16*h*.

Subsequently, as a result of the second communication test performed using the value (22) which is increased by one step from the squelch setting value in the first communication test, "○" (success) is stored as the success flag in the table 16*h*.

Subsequently, as a result of the third communication test performed using the value (33) which is increased by one step from the squelch setting value in the second communication test, "○" (success) is stored as the success flag in the table 16*h*.

Subsequently, as a result of the fourth communication test performed using a value (44) which is increased by one step from the squelch setting value in the third communication test, "○" (success) is stored as the success flag in the table 16*h*.

Subsequently, as a result of the fifth communication test performed using a value (55) which is increased by one step from the squelch setting value in the fourth communication test, "x" (failure) is stored as the failure flag in the table 16*h*.

The squelch setting control circuit 16*g* performs control to sequentially read the success flags associated with the different squelch setting values from the table 16*h*, count the number of success flags, and obtain the number of success steps.

Since the number of test results with "○" (success) is four, that is, an even number, the center value is not to be determined. Accordingly, it is appropriate to take a margin into account and adopt, as the adjusted center value, the squelch setting value (33) that is a value closer to a maximum squelch setting value by one step among middle squelch setting values of the success steps.

In the first embodiment, the DC voltage selection circuit 16*f* selects two DC voltages from among multiple DC voltages in accordance with a squelch setting value output from the register 16*e*, and supplies the two DC voltages as threshold voltages to the squelch detection circuit 16*c*. In response to the start pattern detection circuit 16*d* detecting a receivable state, the squelch setting control circuit 16*g* performs control to change the squelch setting value to increase the squelch setting value in steps and sequentially set the squelch setting value in the register 16*e*. In this manner, the squelch setting control circuit 16*g* adjusts the squelch setting value to a value that enables successful reception at the time of connection of the USB cable 30. This successfully suppresses erroneous detection caused by a variation in characteristics.

Consequently, erroneous detection of the squelch state and the non-squelch state caused by the variation in characteristics of the individual communication devices 16 is successfully suppressed. Since the communication error is avoided before the communication error occurs, the number of times of recovery processing is successfully reduced.

Second Embodiment

A block diagram illustrating a configuration of a communication device according to a second embodiment of the present disclosure has characteristics that following components among those illustrated in FIG. 2 are included.

In response to the start pattern detection circuit 16*d* detecting a receivable state, the squelch setting control circuit 16*g* performs control to change a squelch setting value (data) to decrease the squelch setting value in steps and sequentially set the squelch setting value (data) in the register 16*e*.

The squelch setting control circuit 16*g* performs control to change the squelch setting value to decrease the squelch setting value in steps, sequentially set the squelch setting value in the register 16e, and sequentially store the squelch setting value in the table 16h.

The squelch setting control circuit 16g performs control to sequentially set, in the register 16e, the squelch setting value that is changed to decrease in steps. In response to the start pattern detection circuit 16d detecting a transition of the receivable state to a not-receivable state at a certain step, the squelch setting control circuit 16g performs control to switch the squelch setting value set in the register 16e to a value that is smaller than the set squelch setting value by one step or two steps.

Control Procedure

Figure 8:
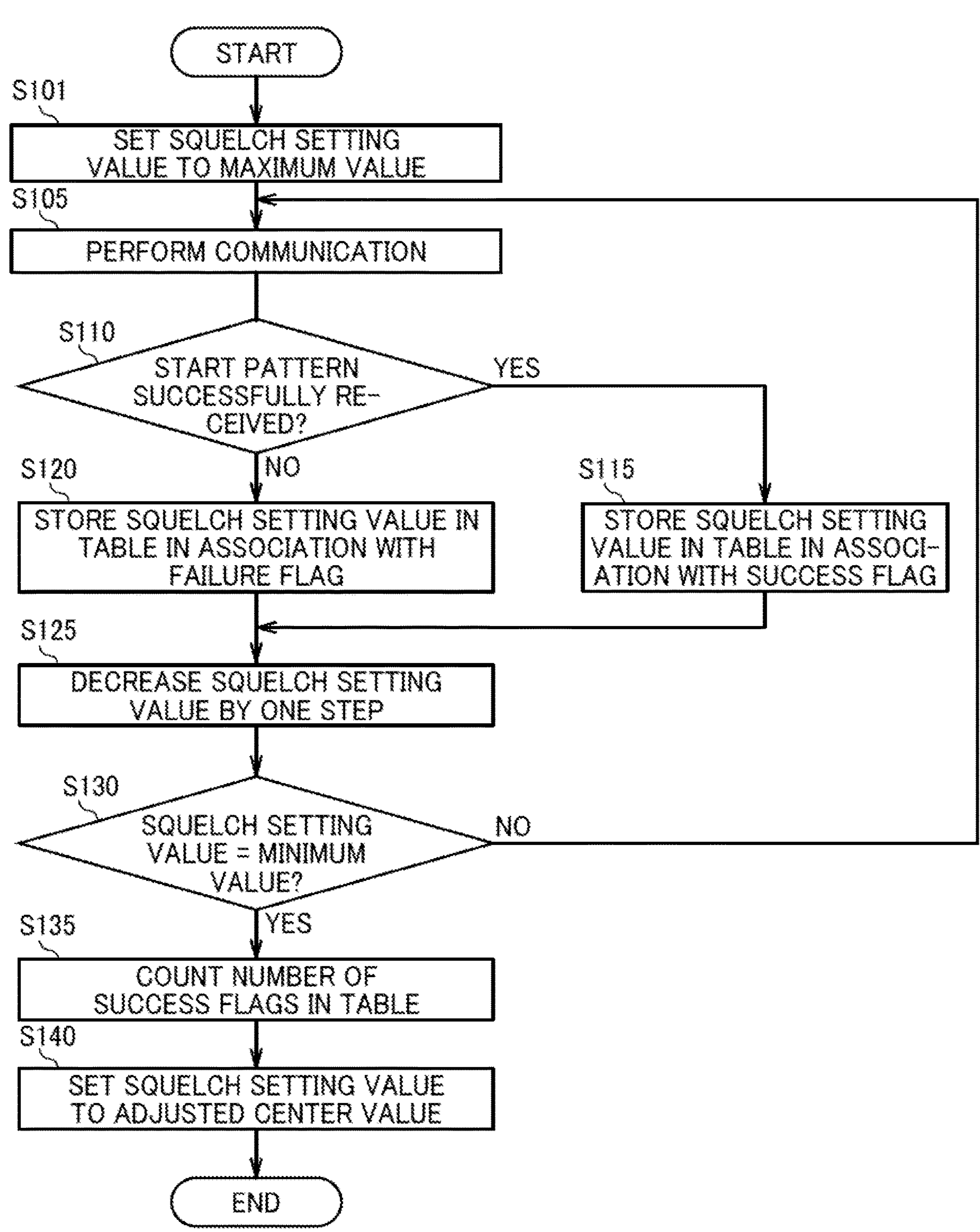
FIG. 8 is another flowchart illustrating a control procedure of a reception-side communication device which is a communication device according to a second embodiment of the present disclosure.

FIG. 8 is another flowchart illustrating a control procedure of the reception-side communication device 16 which is the communication device according to the second embodiment of the present disclosure.

The flowchart according to the second embodiment illustrated in FIG. 8 has characteristics that in response to the start pattern detection circuit 16d detecting the receivable state, the squelch setting control circuit 16g performs control to change the squelch setting value (data) to decrease the squelch setting value in steps and sequentially set the squelch setting value in the register 16e. The characteristics of the flowchart will be described in detail below.

The squelch setting control circuit 16g according to the second embodiment performs control to sequentially switch the threshold voltages from the outside toward the inside of the eye opening. That is, the squelch setting control circuit 16g performs control to change the squelch setting value (data) to decrease the squelch setting value in steps and sequentially set the squelch setting value in the register 16e.

In step S101, at the initial booting, the squelch setting control circuit 16g sets the maximum (Max) squelch setting value ($D_H D_L$) (e.g., "66") in the register 16e.

For example, once the value (66) is set as the data ($D_H D_L$) in the register 16e, the selector switch SL operates in accordance with the value (66) which is the data ($D_H D_L$) and selects voltages to be output as the high-level threshold voltage $V_{rH}$ and the low-level threshold voltage $V_{rL}$ to the squelch detection circuit 16c from among the voltages generated by the voltage generation circuit VG.

In step S105, the communication device 27 and the communication device 16 perform communication of the differential signal via the USB cable (communication cable) 30. In this case, the communication device 27 transmits, to the communication device 16, packet signals in which a packet signal of the squelch state having no signal and a packet signal of the non-squelch state having a predetermined start pattern are alternately repeated in a time-division manner.

In step S110, the squelch setting control circuit 16g of the communication device 16 determines whether the start pattern detection circuit 16d has successfully received, via the signal reception circuit 16b, the packet signal representing the predetermined start pattern transmitted from the communication device 27.

Specifically, if the squelch setting control circuit 16g determines that the start pattern detection circuit 16d has successfully received the packet signal representing the predetermined start pattern from the communication device 27, the process to proceeds to step S115. On the other hand, if the squelch setting control circuit 16g determines that the communication device 16 fails to receive the predetermined start pattern transmitted from the communication device 27, the process proceeds to step S120.

In the case of YES in step S110, in response to the start pattern detection circuit 16d detecting the receivable state, the squelch setting control circuit 16g performs control to store a success flag in the table 16h in association with the squelch setting value used at the time of the detecting of the receivable state in step S115. The process then proceeds to step S125.

On the other hand, in the case of No in step S110, the squelch setting control circuit 16g stores a failure flag in the table 16h in association with the squelch setting value in step S120. The process then proceeds to step S125.

In step S125, the squelch setting control circuit 16g decreases the squelch setting value in the communication device 16 by one step from the current value and sets the resulting setting value in the register 16e. The process then proceeds to step S130.

In step S130, the squelch setting control circuit 16g determines whether the squelch setting value in the communication device 16 is the minimum value.

If the squelch setting control circuit 16g determines that the squelch setting value in the communication device 16 is the minimum value, the process proceeds to step S135. On the other hand, the squelch setting control circuit 16g determines that the squelch setting value in the communication device 16 is not the minimum value, the process returns to step S105.

In step S105, the communication device 27 and the communication device 16 perform communication of the differential signal via the USB cable (communication cable) 30.

In the case of Yes in step S130, the squelch setting control circuit 16g performs control to sequentially read the success flags associated with the different squelch setting values from the table 16h, count the number of success flags, and obtain the number of success steps in step S135.

In step S140, the squelch setting control circuit 16g adjusts the squelch setting value in the communication device 16 and sets the squelch setting value to the center value at which connection is successful.

Specifically, if the number of success steps is an odd number, the squelch setting control circuit 16g performs control to set the squelch setting value that enables successful reception to the center value of squelch setting values of the success steps.

On the other hand, if the number of success steps is an even number, the squelch setting control circuit 16g performs control to set the squelch setting value that enables successful reception to a value closer to a maximum squelch setting value by one step among middle squelch setting values of the success steps.

In the second embodiment, the DC voltage selection circuit 16f selects two DC voltages from among multiple DC voltages in accordance with a squelch setting value output from the register 16e, and supplies the two DC voltages as threshold voltages to the squelch detection circuit 16c. In response to the start pattern detection circuit 16d detecting a receivable state, the squelch setting control circuit 16g performs control to change the squelch setting value to decrease the squelch setting value in steps and sequentially set the squelch setting value in the register 16e. In this manner, the squelch setting control circuit 16g adjusts the squelch setting value to a value that enables successful reception at the time of connection of the USB cable 30. This successfully suppresses erroneous detection caused by a variation in characteristics.

Consequently, erroneous detection of the squelch state and the non-squelch state caused by the variation in characteristics of the individual communication devices 16 is successfully suppressed. Since the communication error is avoided before the communication error occurs, the number of times of recovery processing is successfully reduced.

Aspect 1

According to Aspect 1, a communication device includes a signal reception circuit 16*b*, a squelch detection circuit 16*c*, a start pattern detection circuit 16*d*, a register 16*e*, a DC voltage selection circuit 16*f*, and a squelch setting control circuit 16*g*. The signal reception circuit 16*b* receives a differential signal transmitted from another communication device via a USB cable 30, and converts the differential signal into binary data. The squelch detection circuit 16*c* compares an amplitude level of the differential signal with threshold voltages to detect presence or absence of a signal and detect a non-squelch state and a squelch state. The start pattern detection circuit 16*d* enters a receivable state in response to a predetermined start pattern being detectable from the binary data based on the differential signal in a case where the squelch detection circuit 16*c* detects the non-squelch state. The register 16*e* stores a squelch setting value associated with the threshold voltages. The DC voltage selection circuit 16*f* selects two DC voltages from among multiple DC voltages in accordance with the squelch setting value output from the register 16*e*, and supplies the two DC voltages as the threshold voltages to the squelch detection circuit 16*c*. The squelch setting control circuit 16*g* performs control, in response to the start pattern detection circuit detecting the receivable state, to change the squelch setting value to increase or decrease the squelch setting value in steps and sequentially set the squelch setting value in the register.

According to Aspect 1, the DC voltage selection circuit 16*f* selects two DC voltages from among multiple DC voltages in accordance with a squelch setting value output from the register 16*e*, and supplies the two DC voltages as threshold voltages to the squelch detection circuit 16*c*. In response to the start pattern detection circuit 16*d* detecting a receivable state, the squelch setting control circuit 16*g* performs control to change the squelch setting value to increase or decrease the squelch setting value in steps and sequentially set the squelch setting value in the register 16*e*. In this manner, the squelch setting control circuit 16*g* adjusts the squelch setting value to a value that enables successful reception at the time of connection of the USB cable 30. This successfully suppresses erroneous detection caused by a variation in characteristics.

Consequently, erroneous detection of the squelch state and the non-squelch state caused by the variation in characteristics of the individual communication devices 16 is successfully suppressed.

Aspect 2

According to Aspect 2, in the communication device of Aspect 1, the squelch setting control circuit 16*g* includes a table 16*h*. The table 16*h* stores the squelch setting value. The squelch setting control circuit 16*g* performs control to change the squelch setting value to increase or decrease the squelch setting value in steps, sequentially set the squelch setting value in the register 16*e*, and sequentially store the squelch setting value in the table 16*h*.

According to Aspect 2, the squelch setting control circuit 16*g* performs control to change the squelch setting value to increase or decrease the squelch setting value in steps, sequentially set the squelch setting value in the register 16*e*, and sequentially store the squelch setting value in the table 16*h*. Consequently, the squelch setting value is successfully stored in the table 16*h* sequentially.

Aspect 3

According to Aspect 3, in the communication device of Aspect 2, the squelch setting control circuit 16*g* performs control, in response to the start pattern detection circuit 16*d* detecting the receivable state, to store a success flag in the table 16*h* in association with a squelch setting value used at time of the detecting of the receivable state.

According to Aspect 3, the squelch setting control circuit 16*g* successfully performs control, in response to the start pattern detection circuit 16*d* detecting the receivable state, to store a success flag in the table 16*h* in association with a squelch setting value used at time of the detecting of the receivable state.

Aspect 4

According to Aspect 4, in the communication device of Aspect 3, the squelch setting control circuit 16*g* performs control to read success flags associated with different squelch setting values from the table 16*h*, count the number of success flags, and obtain the number of success steps.

According to Aspect 4, the squelch setting control circuit 16*g* successfully performs control to read the success flags associated with different squelch setting values from the table 16*h*, count the number of success flags, and obtain the number of success steps.

Aspect 5

According to Aspect 5, in the communication device of Aspect 4, in a case where the number of success steps is an odd number, the squelch setting control circuit 16*g* performs control to set the squelch setting value that enables successful reception to a center value of squelch setting values of the success steps.

According to Aspect 5, in the case where the number of success steps is an odd number, the squelch setting control circuit 16*g* successfully performs control to set the squelch setting value that enables successful reception to a center value of squelch setting values of the success steps.

This allows the squelch detection circuit 16*c* to avoid erroneous detection, allows the communication error to be avoided before the communication error occurs, and successfully reduces the number of times of recovery processing. Thus, a communication environment that enables stable communication is successfully provided.

Aspect 6

According to Aspect 6, in the communication device of Aspect 4, in a case where the number of success steps is an even number, the squelch setting control circuit 16*g* performs control to set the squelch setting value that enables successful reception to a value closer to a maximum squelch setting value by one step among middle squelch setting values of the success steps.

According to Aspect 6, in the case where the number of success steps is an even number, the squelch setting control circuit 16*g* successfully performs control to set the squelch setting value that enables successful reception to a value closer to a maximum squelch setting value by one step among middle squelch setting values of the success steps.

This allows the squelch detection circuit 16*c* to avoid erroneous detection due to an influence of noise or the like, allows the communication error to be avoided before the communication error occurs, and successfully reduces the number of times of recovery processing. Thus, a communication environment that enables stable communication is successfully provided.

Aspect 7

According to Aspect 7, in the communication device of Aspect 1, the squelch setting control circuit 16*g* performs control to sequentially set, in the register 16*e*, the squelch setting value that is changed to increase or decrease in steps, and in response to the start pattern detection circuit 16*d* detecting a transition of the receivable state to a not-receivable state at a certain step, performs control to switch the squelch setting value set in the register 16*e* to a value that is smaller than the set squelch setting value by one step or two steps.

According to Aspect 7, the squelch setting control circuit 16*g* successfully performs control to sequentially set, in the register 16*e*, the squelch setting value that is changed to increase or decrease in steps, and in response to the start pattern detection circuit 16*d* detecting a transition of the receivable state to a not-receivable state at a certain step, successfully performs control to switch the squelch setting value set in the register 16*e* to a value that is smaller than the set squelch setting value by one step or two steps.

Consequently, erroneous detection of the squelch state and the non-squelch state caused by the variation in characteristics of the individual communication devices 16 is successfully suppressed.

Aspect 8

According to Aspect 8, an image forming apparatus includes the communication device 16 of any one of Aspects 1 to 7.

According to Aspect 8, the image forming apparatus 1 includes the communication device 16 of any one of Aspects 1 to 7. When the USB cable 30 is connected to the communication device 16 included in the image forming apparatus 1, the squelch setting value is adjusted to a value that enables successful reception. This successfully suppresses erroneous detection caused by a variation in characteristics.

Consequently, erroneous detection of the squelch state and the non-squelch state caused by the variation in characteristics of the individual communication devices 16 included in the image forming apparatus 1 is successfully suppressed.

The invention claimed is:

1. A receiving communication device configured to receive a signal from a transmitting communication device, the receiving communication device comprising:

a signal reception circuit configured to receive a differential signal transmitted from the transmitting communication device via a communication cable, and convert the differential signal into binary data;

a squelch detection circuit configured to compare an amplitude level of the differential signal with threshold voltages to detect a non-squelch state and a squelch state;

a start pattern detection circuit configured to detect a state in which a predetermined start pattern is detectable from the binary data based on the differential signal, as a receivable state;

a register that stores a squelch setting value associated with the threshold voltages to detect the non-squelch state and the squelch state;

a DC voltage selection circuit configured to select two DC voltages from among multiple DC voltages in accordance with the squelch setting value output from the register, and supply, to the squelch detection circuit, the two DC voltages as the threshold voltages to detect the non-squelch state and the squelch state;

a squelch setting control circuit configured to, in response to the start pattern detection circuit detecting the receivable state, change the squelch setting value to increase or decrease the squelch setting value in steps and sequentially set the squelch setting value in the register as a reception squelch setting value used for the receivable state; and a table configured to store the squelch setting value, wherein the squelch setting control circuit is further configured to sequentially store the squelch setting value in the table, store, in response to the start pattern detection circuit detecting the receivable state, a success flag in the table in association with a squelch setting value used at time of the detecting of the receivable state, read success flags associated with different squelch setting values from the table, count a number of success flags, and obtain a number of success steps, and set a center value of squelch setting values of the success steps or a value closer to a maximum squelch setting value by one step among middle squelch setting values of the success steps, as the reception squelch setting value.

2. The receiving communication device according to claim 1, wherein in a case where the number of success steps is an odd number, the squelch setting control circuit sets the center value of the squelch setting values of the success steps, as the reception squelch setting value.

3. The receiving communication device according to claim 1, wherein in a case where the number of success steps is an even number, the squelch setting control circuit sets the value closer to the maximum squelch setting value by one step among the middle squelch setting values of the success steps, as the reception squelch setting value.

4. The receiving communication device according to claim 1, wherein the squelch setting control circuit is further configured to in response to the start pattern detection circuit detecting a transition of the receivable state to a not-receivable state, switch the reception squelch setting value set in the register to a value that is smaller than the squelch setting value used at time of the detecting of the transition by one step or two steps.

5. An image forming apparatus comprising:

the receiving communication device according to claim 1.

* * * * *